UNITED STATES PATENT OFFICE.

HEINRICH CARO, OF MANNHEIM, GRAND DUCHY OF BADEN, GERMANY.

IMPROVEMENT IN THE PRODUCTION OF DYE-STUFFS FROM METHYL-ANILINE.

Specification forming part of Letters Patent No. 204,796, dated June 11, 1878; application filed March 28, 1878.

*To all whom it may concern:*

Be it known that I, HEINRICH CARO, of Mannheim, in the Grand Duchy of Baden, in the Empire of Germany, have invented a new and useful Improvement in Dye-Stuffs or Coloring-Matters, which improvement is fully described in the following specification.

The object of my invention is the production of a blue dye-stuff or coloring-matter, which is derived from tertiary monamines, and particularly from dimethyl-aniline.

My invention is based on suggestions made by Charles Lauth, (Bericht der Deutschen Chemischen Gesellschaft, 1876, page 1035; Bulletin de la Société Chimique de Paris, 1876, II Sem., page 422,) who obtained a purple coloring-matter by the action of sulphureted hydrogen and of oxidizing bodies upon the para-diamido compounds of benzole or its homologues. This reaction, however, has not yet received any practical or industrial application, chiefly because the purple coloring-matters thus obtained offer neither in point of quality nor of economy any advantage, when compared with the already existing coloring-matters of a similar tint.

By using, among others, the chemical agents indicated by Lauth, I have succeeded in producing from dimethyl-aniline, and some other tertiary monamines, in a direct and economical manner, a blue dye-stuff or coloring-matter, which forms the subject of my present invention.

The process of producing this blue dye-stuff or coloring-matter is divided into three successive steps: first, production of nitroso-dimethylaniline; second, reduction of this substance into amido-dimethylaniline; third, transformation of the latter into the blue dye-stuff or coloring-matter which I have termed "Methylene-Blue."

First step: For the purpose of producing nitroso-dimethylaniline, I prepare a cold solution of ten kilograms dimethyl-aniline in thirty kilograms concentrated muriatic acid and two hundred liters water. To this mixture I add a solution of 5.7 kilograms pure nitrite of soda (one atom) by allowing it to run in slowly, while constantly agitating the mixture, for from four to five hours. The mixture assumes a yellow color, and it contains crystals and a solution of the muriate of nitroso-dimethylaniline. Instead of using the pure nitrite of soda, an equivalent quantity of free nitrous acid or other compounds of this acid may be used.

Second step: For the purpose of reducing the nitroso-dimethylaniline into amido-dimethylaniline, the ordinary agents may be used, such as metals—viz., iron, tin, or zinc; but I prefer to use for this purpose sulphureted hydrogen in the following manner: I place the solution of muriate of nitroso-dimethylaniline, obtained as above stated, into a wooden tank, which is closed, and provided with a mechanical agitating device, and with an escape for the surplus sulphureted hydrogen, and I add to said solution five hundred liters of water and fifty kilograms of concentrated muriatic acid. Then I inject a stream of sulphureted hydrogen until the yellow color of the solution disappears entirely. During the reduction the liquid assumes for a time a red color, and finally it becomes colorless, while its surface is covered with a blue froth or scum. In this stage the solution contains muriate of amido-dimethylaniline, and already a portion of the new sulphureted coloring-matter in the form of a colorless compound. Instead of gaseous sulphureted hydrogen, I can use in the same manner sulphuret of sodium, sulphuret of ammonium, or other sulphurets which are decomposed by muriatic acid, to be added successively to the solution.

Third step: The formation of the blue coloring-matter requires the addition of an oxidizing agent to the solution, which is obtained under the second step, and which is colorless and saturated with sulphureted hydrogen. For this purpose I add to the same slowly two hundred liters of a solution of perchloride of iron, (specific gravity 1.07,) or a sufficient quantity of the same until the odor of sulphureted hydrogen disappears, and a small surplus of the oxidizing agent is present. Instead of perchloride of iron, I can use an equivalent quantity of bichromate of potash, or of a similar oxidizing agent; but I prefer the perchloride of iron on account of its cheapness. Instead of causing the oxidizing agent to act on the solution of amido-dimethylaniline containing sulphureted hydrogen, I can reverse the operation by treating the amido-dimethylaniline first with the oxidizing agent, and then converting the colorless and inconstant oxidized product thus formed and contained in a strongly acid solution into the blue coloring matter. In this case it is requisite that the oxidation and the introduction of sulphureted hydrogen shall follow each other rapidly, and the introduction of the sulphureted hydrogen must be stopped as soon as this gas slightly predominates. For this reason the last-named process is more difficult than that first described.

The separation of my blue coloring-matter is effected as follows: The mixture is saturated with common salt, and a sufficient quantity of an aqueous solution of chloride of zinc is added until the coloring-matter appears completely precipitated. Then the mass is filtered, and from the substance remaining on the filter the blue coloring-matter, which is easily soluble in water, is separated by successive treatment with water. The filtered solutions of the same are again saturated with common salt, and by the addition of chloride of zinc, and by filtering, pressing, and drying, the desired coloring-matter is obtained as a compound with chloride of zinc in the form of a brown bronze-powder. In this form the new coloring-matter is easily soluble in water and adapted for technical use. For this reason the chloride of zinc is used in preference to other metallic salts and precipitating agents, which also allow of bringing the new coloring-matter in a marketable condition; but I do not confine myself to the use of chloride of zinc.

The production of amido-dimethylaniline can also, as is well known, be effected by the reduction of mono-nitro-dimethylaniline; and, furthermore, this base is also formed when any diazo compound is transformed into an azo compound of dimethyl-aniline, by bringing it together in its atomic proportion with dimethyl-aniline, and such azo compound is treated with reducing agents.

For the practical manufacture of my blue coloring-matter, however, I consider the transition through the nitroso-dimethylaniline, as above described, the most advantageous.

By the process above described blue coloring-matter can also be produced out of dimethyl-aniline, dimethyl-orthotoluidine, methyl and ethyl diphenylamine, and analogous tertiary monamines, the same as out of dimethyl-aniline. Such coloring-matters, however, possess no superiority over the coloring-matter produced from dimethyl-aniline, either as regards the cost of their production or their coloring properties.

The proportions which I have given for mixing the different substances together give a satisfactory result; but they can be changed within wide limits, and I do not limit myself, therefore, to the exact proportions above stated.

My new dye-stuff or coloring-matter, "methylene-blue," when produced in the form of a powder, has a dark-bluish color, not dichroic; it is easily soluble in water; it is but very slightly affected by acids or alkalies; by reducing agents, such as zinc-dust, it is decolorized, and when brought in contact with air it will reassume its color; when it is brought together with metallic tannates, insoluble blue compounds are formed; and in dyeing and printing, this property is employed by forming said insoluble compounds in the fiber of the fabric.

In these points my methylene blue differs essentially from the so-called "methyl-blue," and from all aniline-blues known to me, since these coloring-matters are reduced by alkalies, and they do not form insoluble blue compounds when brought together with metallic tannates, which facts are well known to practical dyers, and to dealers in coloring-matters and dye-stuffs.

What I claim as new, and desire to secure by Letters Patent, is—

As a new manufacture, a dye-stuff or coloring-matter having the characteristics above described, and produced by means substantially such as herein set forth, or by any other means which will produce a like result.

In testimony that I claim the foregoing I have hereunto set my hand and seal this 22d day of February, 1878.

HEINRICH CARO. [L. S.]

Witnesses:
 WM. PICKHAR
 C. GLASER.